R. J. HAYNES.
GATHERING AND EXTERMINATING MACHINE.
APPLICATION FILED JAN. 30, 1917.

1,239,103.

Patented Sept. 4, 1917.
3 SHEETS—SHEET 1.

INVENTOR
R. J. HAYNES.
BY
Jack N Schley
ATTORNEY

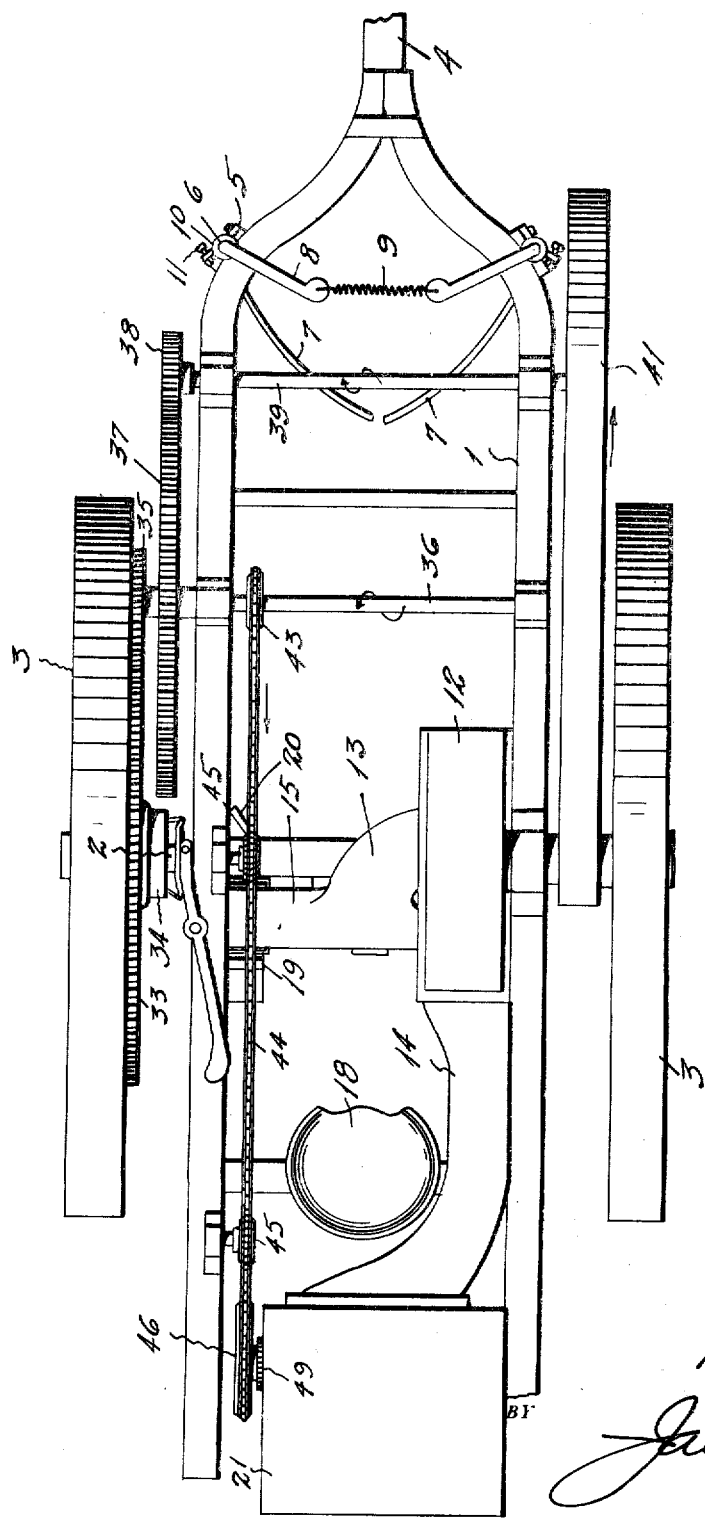

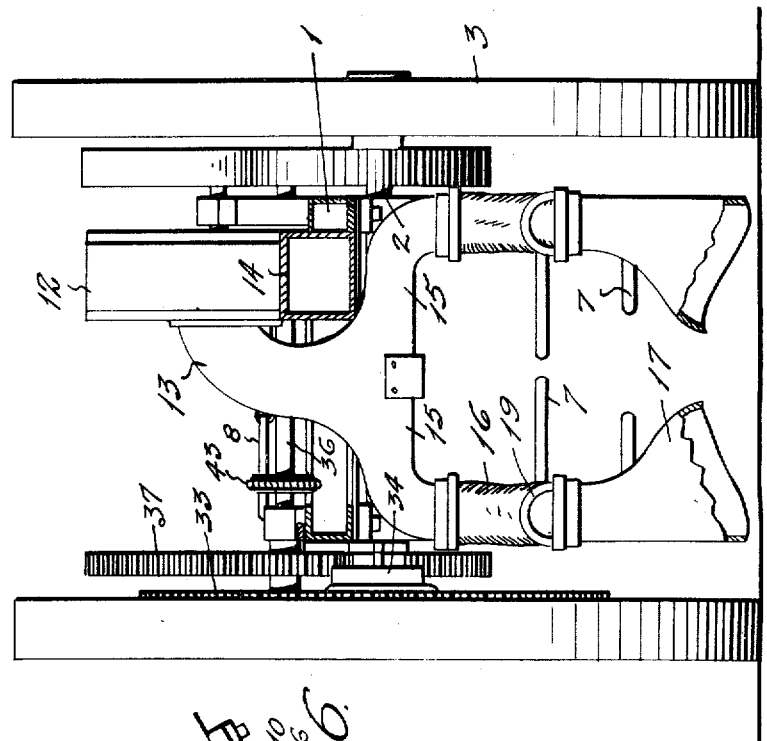

UNITED STATES PATENT OFFICE.

ROBERT J. HAYNES, OF RAZOR, TEXAS.

GATHERING AND EXTERMINATING MACHINE.

1,239,103.      Specification of Letters Patent.      Patented Sept. 4, 1917.

Application filed January 30, 1917. Serial No. 145,350.

*To all whom it may concern:*

Be it known that I, ROBERT J. HAYNES, citizen of the United States, residing at Razor, in the county of Lamar and State of Texas, have invented certain new and useful Improvements in Gathering and Exterminating Machines, of which the following is a specification.

This invention involves means for destroying plant infesting insects, eggs, worms and larvæ and thus gradually exterminating such parasites as boll weevils, worms, potato and other bugs and other crop destroyers.

It is proposed to accomplish this result by means of an implement drawn through the field and equipped with means for dislodging from the plants, all insects, dead squares and buds, and other diseased vegetable matter. Suitable means is also provided on the frame of the implement for picking up the dislodged matter together with previously fallen matter and conveying the same to a grinding device.

In carrying out the invention a wheel supported frame is provided and equipped with spring returned knocking arms which are spread apart by the plants and brought together when released, thus jarring the plants and dislodging diseased vegetation as well as insects and worms. The dislodged matter falls to the ground and a suction creating device mounted on the frame is provided with depending boots which suck up said matter. This device also acts as a conveyer and carries the matter rearward to a grinder. This device should be constructed to release the air and not to choke up.

The invention will be more readily understood from a perusal of the following specification and by reference to the accompanying drawings, in which an example of the invention is shown and wherein:

Fig. 2 is a plan view,

Fig. 3 is a transverse sectional view on the line 3—3 of Fig. 1,

Fig. 4 is a transverse sectional view of the grinding device,

Fig. 5 is a rear elevation of the grinding device, portions being illustrated in section, and Fig. 6 is a detail of the spring arm stop.

Figure 1:
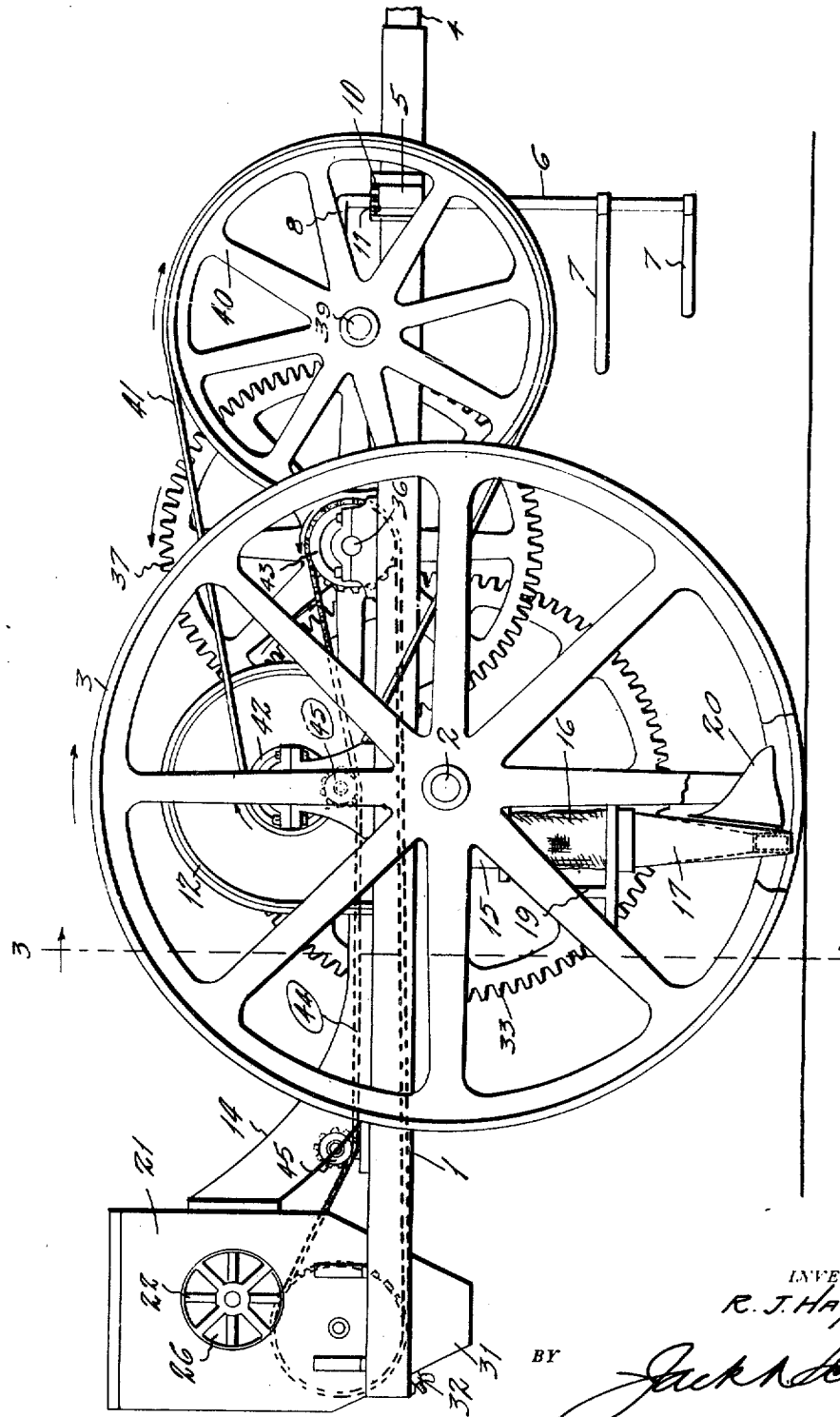
Figure 1 is a side elevation of the machine.

In the drawings the numeral 1 designates a horizontal frame mounted on an axle 2 supported in ground wheels 3. The forward end of the frame is contracted and has a tongue 4 fixed therein. At each side of the forward end of the frame a bearing box 5 is secured and each box supports a depending shaft 6. Each shaft has fixed thereon inwardly and rearwardly curved fingers 7. These fingers project toward each other, the upper fingers coming nearer together than the lower. The upper end of each shaft is provided with an inwardly extending rocker arm 8 and these arms are connected by a coiled spring 9. The spring tends to pull the arms together. For limiting the inward swing of the shafts and fingers a collar 10 is fastened on each shaft and carries a set screw 11 which abuts the correlated box 5; this collar also supports the shaft. By adjusting the screw the amplitude of the return swing of the fingers may be controlled. The fingers are set so that when the machine is drawn along a row of plants the stalks of the latter will pass therebetween, but the branches and limbs will swing the fingers outward against the tension of the spring. As the fingers pass over a limb they will have a tendency to spring inward, thus severely agitating or jarring the plants whereby dead squares or buds and all insects and worms will be dislodged. The action is not severe enough to injure the plant and may be controlled by varying the tension of the spring 9. It is to be understood that other means for dislodging the vegetable matter and insects and worms from the plants could be used if desired and that variations in the structure shown could be made.

While considerable matter both vegetable and animal will be dislodged from the plants, quite a little vegetable matter will have fallen to the ground, the quantity depending on the agricultural conditions and the prevalency of the vermin. This matter will lodge mostly along the sides of the row and in the furrow between the rows. While various devices for picking the dislodged animal and vegetable matter from the ground might be employed, I have found a suction creating device the most practical. On one side of the frame a suction fan 12 is mounted and provided with a depending suction trunk 13 on its inner side and an exhaust trunk 14 leading from its rear. The trunk 13 has two branches 15 from which flexible legs 16 hang on each side of the machine. These legs each have a suction boot 17 disposed transversely of the machine and having its lower edge shaped to conform to the general transverse contour of the row to be traversed. The frame also carries a driver's seat 18; while stirrups 19 are secured to the upper ends of the boots. The driver places his feet in the stirrups and owing to flexible legs, may swing the boots to a limited degree, to pick up matter not directly in their paths. The legs may be made of canvas or other material.

The fan draws the matter into the boots by means of the suction which it creates. Wings 20 are fastened on the front sides of the boots for gently bending parts of the plants to allow the boots to pass. The matter drawn into the boots is sucked up through the legs 16, branches 15, trunk 13 and into the fan casing, from which it is discharged into the trunk 14. This latter trunk leads rearward to the housing 21 of a grinding device. It will be understood the vegetable matter which is picked up will be more or less infested with eggs and larvæ and these must be destroyed. They might be mashed, burnt or treated with an exterminating liquid or agent, but I prefer to grind them and thus assure extermination.

The trunk 14 enters the upper portion of the housing 21 and approximately tangential to a screen roller or cylinder 22 mounted to revolve in the housing and having one of its trunnions 23 extending through one of the side walls of the housing. A crushing or mashing roller 24 is mounted over the screen roller and is arranged to yield radially from said roller 22. The collected animal and vegetable matter delivered by the trunk 14 is cast upon the screen roller and carried under the roller 24, a guard 25 prevents the matter falling down into the housing. The matter and trash must pass over the screen roller to the rear of the housing. The screen roller extends transversely of the frame 1 and the housing and registers with an opening 26 in one of the side walls of said housing. This opening permits the air to escape freely so that the collected matter and trash may pass over the roller 22. By releasing the air the matter may fall by gravity from the rear side of the screen roller and the device cannot choke. Under the screen roller a suitable grinding roller 27 is mounted. This roller has its shaft 28 extending through the same wall as the trunnion 23. A curved breast 29 has its upper end hinged to the rear wall of the housing above the grinding roller and is provided with a serrated section 30 co-acting with the grinding roller. The lower end of the housing is formed into a hopper 31 and the tail of the breast extends down into the same. A spring tension bolt 32 mounted in the rear hopper wall is pivoted to the breast and tends to force the serrated portion 29 toward the grinding roller, but allows the breast to yield from said roller to permit the passage of hard substances. The bolt is adjustable and the relation between the grinding roller and the section 29 is substantially tangential so as to provide a throat into which the matter falls from the screen roller. The animal and vegetable matter after being ground is discharged from the hopper 31 and may either be allowed to fall on the ground or may be suitably collected. It will be understood that the squares, bolls and buds delivered to the grinding device will often contain larvæ or eggs and in order to assure destruction of these, the grinding method has been adopted.

For driving the various parts a large spur gear 33 is loosely mounted on the axle 2, but driven thereby by means of a suitable clutch device 34 of any approved construction. This gear meshes with a pinion 35 fixed on a jack shaft 36 mounted transversely of the frame 1 and also having fixed thereon a large gear 37. The gear 37 drives a pinion 38 fixed on the end of a counter shaft 39 mounted transversely of the frame and having a large pulley 40 secured on its opposite end. The direction of revolution of the gears, pinions and pulleys is clearly indicated by arrows. The large pulley drives by means of a belt 41, a small pulley 42 connected with the fan 12. A sprocket wheel 43 is mounted on the shaft 36 and drives an endless chain 44 which has its upper leg passing under idlers 45 mounted on the side of the frame, while the chain also passes over a sprocket wheel 46 mounted on the shaft 28 of the grinding roller 27. A spur gear 47 is also fastened on the shaft 28 and drives an intermediate pinion 48 mounted on the wall of the housing. This pinion drives a pinion 49 fastened on the trunnion 23 of the screen roller. By this arrangement the rollers 22 and 27 are driven in the same direction. The invention is not to be limited to driven means shown as variations may be made.

The foregoing description and illustration clearly express the invention, but it is to be understood that said illustration is merely an exemplification and the invention may be carried out in other ways.

What I claim, is:

1. In a gathering and exterminating apparatus, the combination of a wheel supported frame, plant agitators depending from the forward end of the frame, a suction fan mounted on the frame, a suction trunk leading from the fan casing, branches leading from the suction trunk, suction boots flexibly connected with the branches and provided with stirrups, an air blast trunk leading from the fan casing, and a grinding device connected with the air blast trunk.

2. In a gathering and exterminating apparatus, the combination with a portable frame, and a suction gathering and conveying structure including depending boots, a suction creating fan, and a conveyer extending from the fan, of a grinding device receiving matter from the conveyer and including an air releasing screen roller over which the collected matter is carried, and grinding means located under the roller.

In testimony whereof I affix my signature.

ROBERT J. HAYNES.